United States Patent [19]

Maiocco

[11] 3,852,011
[45] Dec. 3, 1974

[54] ORIENTED REMOVAL STRUCTURE FOR AN INJECTION MOLDING MACHINE

[75] Inventor: Humbert Luciano Maiocco, Woodlyn, Pa.

[73] Assignee: Beloit Corporation, Beloit, Wis.

[22] Filed: Oct. 25, 1972

[21] Appl. No.: 300,511

[52] U.S. Cl............................ 425/242 R, 425/444
[51] Int. Cl.............................................. B29c 7/00
[58] Field of Search......... 425/436 R, 436 RM, 444, 425/455, 242 R; 164/131, 344, 347, 401, 404

[56] References Cited
UNITED STATES PATENTS

| | | | |
|---|---|---|---|
| 2,864,138 | 12/1958 | Pierce | 164/404 |
| 3,081,486 | 3/1963 | Skvorc | 164/347 X |
| 3,277,521 | 10/1966 | Strauss | 425/436 X |
| 3,277,522 | 10/1966 | Strauss | 425/436 X |

Primary Examiner—Francis S. Husar
Assistant Examiner—David B. Smith
Attorney, Agent, or Firm—Parmelee, Miller, Welsh & Kratz

[57] ABSTRACT

An apparatus is provided for use with an injection molding machine to remove the product in the same orientation in which it was molded.

1 Claim, 3 Drawing Figures

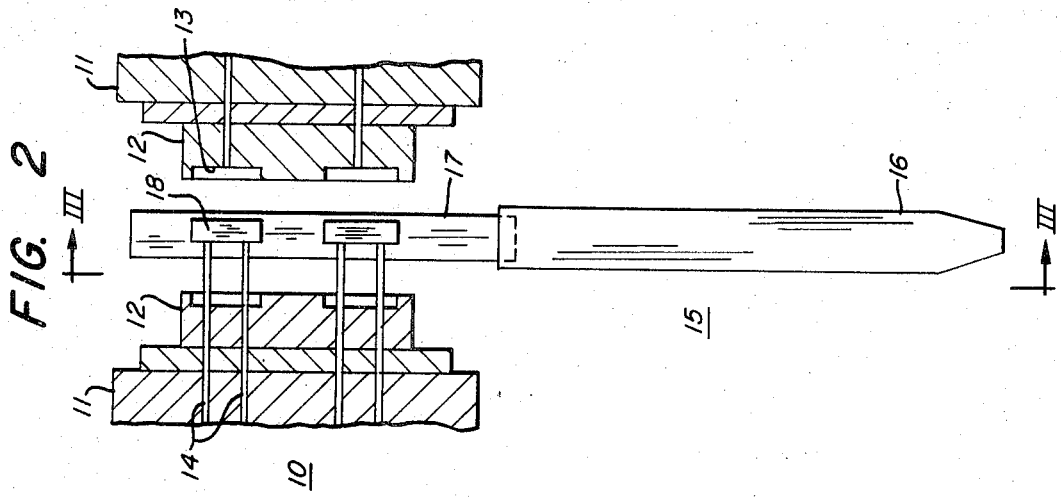
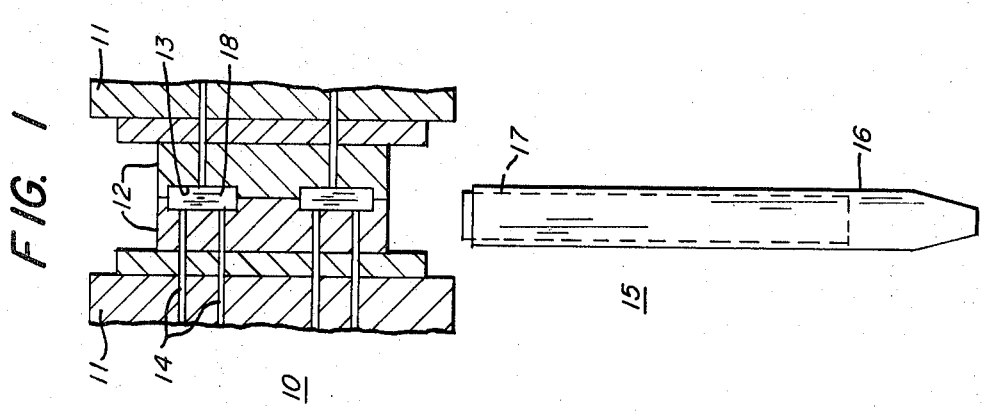

3,852,011

ORIENTED REMOVAL STRUCTURE FOR AN INJECTION MOLDING MACHINE

BACKGROUND OF THE INVENTION

The use of molding apparatus for producing plastic products has continued to increase during recent times. The injection molding of thermoplastic polymers is an important commercial fabrication process. Countless every-day items ranging from containers for personal hygiene products such as toothpaste tube heads and caps, automotive accessories, closures, industrial products and toys are produced by this process. All injection molding operations are carried out while establishing an equilibrium between temperature, pressure and time. The thermoplastic material is heated to the molten state and injected under pressure into a cooled mold cavity formed in a mold assembly which is clamped to withstand pressure. The molded article is then rapidly cooled and ejected from the mold assembly to permit high speed continuous production.

In the manufacture of some itmes, it is desirable to have the product maintain the orientation in which it was molded to ease assembly. For example, in assembling the two halves of a tape cassette, it is necessary to have each half facing the other so that the two halves can be fitted together. In the prior art, the usual means for separating the finished product from the mold is a stripper plate. Such a plate which is an integral mold portion does not control the orientation of the product, and allows the product to tumble as it leaves the machine. With any product requiring later oriented assembly, this necessitates the use of a separate orienting means before the assembly step. Since high speed operation, and reliability and simplicity of operation are key factors in good mold assembly design, this extra step is undesirable.

SUMMARY OF THE INVENTION

A product receiving and orienting means is provided for use with an injection molding apparatus. The injection molding apparatus is of a type well known in the art, having two platens, at least one of which is movable, and interchangeable mold halves attached to the platens. When closed, the mold halves form a mold cavity, into which protrude movable ejector pins. The product receiving and orienting means of the invention is located below the molding apparatus when the mold is in a closed position, and is movable so as to allow it to extend between the platens and about the finished product when the mold is in an open position.

A method is also disclosed for using the product receiving and orienting means to remove the finished product from the open molding apparatus and cause the product to exit in an oriented position.

BRIEF DESCRIPTION OF THE DRAWINGS

FIG. 1 is a schematic view in elevation showing a simplified representation of an injection molding machine in closed position with the receiving and orienting means of the present invention in lowered position.

FIG. 2 is a view similar to FIG. 1 wherein the mold is open and the receiving and orienting means is in raised position about the molded product.

DESCRIPTION OF THE PREFERRED EMBODIMENTS

Figure 3:
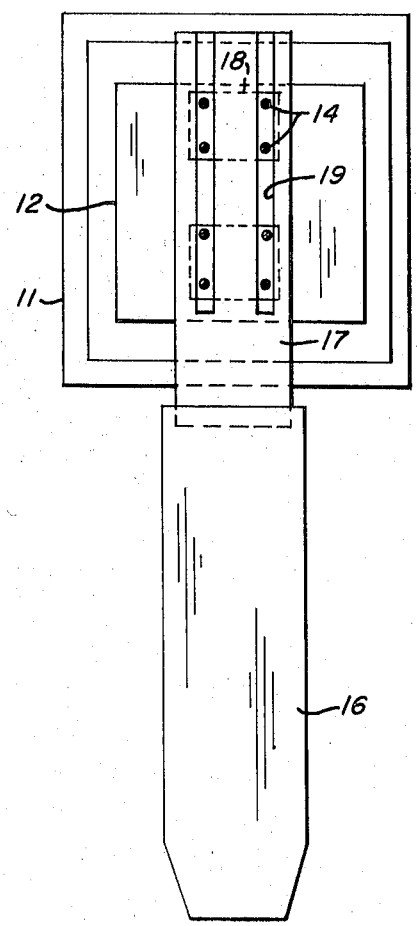
FIG. 3 is a view taken along direction III-III of FIG. 2, showing the receiving and orienting means about the molded product.

The invention can best be understood by reference to the exemplary embodiment shown in the drawings. In FIG. 1, a simplified longitudinal view of an injection molding apparatus including the product receiving and orienting means of the present invention is seen. The injection molding apparatus 10 comprises two platens 11 to which are attached two mold halves 12 in which are formed a plurality of mold cavities 13. A plurality of movable ejector pins 14 pass through the platens 11 and the mold halves 12 and extend partially into the mold cavities 13. A telescoping exit trough 15, comprising a stationary lower section 16 with a funnel-shaped lower end, and a movable upper section 17, is disposed below the injection molding apparatus 10.

By methods well known in the art, a product 18 is formed in each mold cavity 13, and the mold is opened by separating the platens 11. As seen in FIG. 2, the finished product 18 is supported between the separated platens by the movable ejector pins 14. The movable upper portion 17 of the telescoping exit trough 15 is then extended between the platens 11 and about the finished product 18. As seen in FIG. 3, the exit trough has vertical slots 19 laterally aligned with the ejector pins 14 such that when the exit trough is extended, the ejector pins extend through the slots into the trough. When the exit trough is fully extended, the movable ejector pins 14 are retracted. The finished product engages the side of the exit trough and is separated from the ejector pins. The product falls through the exit trough, and is guided by the funnel-shaped lower end of the stationary portion 16 so as to exit the trough in an oriented position.

The specific exit trough configuration is of course designed with respect to the molded product dimensions and shape. The molded product which exits the trough in oriented position can be assembled thereat or conveyed to an assembly station by a conveyor means which supports and conveys the product in the desired orientation. The use of a telescoping exit trough allows for a stationary lower portion such that the lower end of the trough is a constant fixed distance from the conveyor. This prevents the product from disorienting upon exiting from the trough.

The exit trough is described herein as a conventional telescoping unit operated by motive means actuated by the mold opening. Fluid drive cylinders could also be provided to move the exit trough into position between the mold halves when they are in the open position, and to retract the exit trough permitting closing of the mold halves. The exit trough can be movable from the sides of the mold as well as from below. The ejector pin receiving slots provided through the trough wall through which the ejector pins must extend can be varied in configuration depending on the mold cavity arrangement.

The use of ejector pins which contact the molded article is well known, and such pins can be readily made to move away from the mold cavity after the product orienting and receiving means is moved into closely spaced position about the molded product by a separate motive means, not shown, or by spring means, not shown. A spring means, such as conventional means used for moving unscrewing threaded cores, can be used to actuate the ejector pins and cause their withdrawal from the mold cavity area.

Of course, the present invention is usable with a multicavity mold, simply by structuring the product orienting and receiving means properly, with aligned apertures or slots to receive each of the ejector pins as the product orienting and receiving means is moved into product engaging position.

The present invention thus simplifies orientation and assembly of molded thermoplastic articles.

I claim:

1. In an apparatus for injection molding thermoplastic products having at least two platens, at least one being movable, mold halves attached to said platens, a mold cavity formed by said mold halves, movable ejector pins extending partially into said cavity, and means for injecting plastic into said cavity, the improvement comprising a movable finished product receiving and orienting means disposed outside the platen area during the molding process and movable upon mold opening to a position between said spaced platens, closely spaced from and about the finished product, said receiving and orienting means being shaped to receive the product and place it in a predetermined orientation, and comprising a telescoping exit trough which is disposed below the mold portions during molding, and which telescopes upward into position about the ejector pin supported product when the mold is opened, said telescoping exit trough having a movable upper receiving portion having ejector pin receiving apertures therein and a stationary lower funneling portion through which the product exits.

* * * * *